United States Patent [19]
Shipley

[11] Patent Number: 5,634,114
[45] Date of Patent: May 27, 1997

[54] DYNAMIC LINK LIBRARY VERSION NEGOTIATION

[75] Inventor: Glen C. Shipley, Portland, Oreg.

[73] Assignee: Intel Corporation, Santa Clara, Calif.

[21] Appl. No.: 498,006

[22] Filed: Jul. 3, 1995

Related U.S. Application Data

[63] Continuation-in-part of Ser. No. 154,269, Nov. 18, 1993, abandoned.

[51] Int. Cl.⁶ .................................................. G06F 9/45
[52] U.S. Cl. ..................... 395/500; 395/701; 395/710; 395/712
[58] Field of Search ..................................... 395/700, 500

[56] References Cited

U.S. PATENT DOCUMENTS

| | | | |
|---|---|---|---|
| 4,558,413 | 12/1985 | Schmidt et al. | 364/300 |
| 4,912,637 | 3/1990 | Sheedy et al. | 364/300 |
| 5,414,854 | 5/1995 | Heninger et al. | 395/700 |

OTHER PUBLICATIONS

Duncan, "Advanced MS–DOS Programming", 2d. edition, Microsoft Press, 1998, pp.30–33.
"UNIX System V/386 Release 3.2 Programmer's Guide", vol. II, Prentice Hall, 1989, Chap. 14.
UNIX System V/386 Release 3.2 Programmer's Reference Manual, Prentice Hall 1989, chkshlib(1), get(1), make(1) and mkshlib(1).
Ralph Davis, "Windows Network Programming—How to Survive in a World of Windows, DOS and Networks" Addison Wesley, Mar. 1994 ch. 6, pp. 203–239.
Coutant et al., "Shared Libraries for HP-UX", Hewlett-Packard Journal, Jun. 1992 v43 p. 46(8).

*Primary Examiner*—Kevin A. Kriess
*Assistant Examiner*—Kakali Chaki
*Attorney, Agent, or Firm*—Blakely, Sokoloff, Taylor & Zafman

[57] ABSTRACT

The version negotiation of the present invention insures that there will always be an expected data and control interface between a Dynamic Link Library (DLL) and an application program that relies on the DLL. The application program makes an initial call to the DLL that specifies the DLL version with which it prefers to operate. The DLL compares this preferred version number to the version numbers that it supports, which are in a supported DLL version table within the DLL. If the preferred version matches one of the table entries, then the DLL returns an "OK" flag to the application program. In this case, the application program goes on with its normal execution. However, if the preferred version is not supported, then the DLL returns to the application program a "not OK" flag and a list of versions that it does support from its table of supported versions. In response, the application program looks up the versions on this list in a table of compatible versions contained within the application program. If none are found, then the application performs an error trap. If one is found, then the application program calls the DLL to establish that version as the one which will be used. The present invention advantageously utilizes a header file in order to designate DLL versions.

16 Claims, 6 Drawing Sheets

DYNAMIC LINK LIBRARY VERSION NEGOTIATION

BACKGROUND OF THE INVENTION (1) Related Application

This application is a continuation-in-part of Ser. No. 154,269, filed Nov. 18, 1993, now abandoned which has been assigned to the assignee of this application.

(2) Field of the Invention

The present invention relates to the field of computer systems and computer software applications. Specifically, the present invention relates to the field of computer program development and execution.

(3) Background

Some programs executed by computer systems are constructed using a particular set of development tools and are translated from a high level programming language to an executable format according to a particular process. For instance, in order to develop a program written in a high level language, such as the C language, a program is first entered into an editor using the C instruction format and the "C program" is then compiled by a compiler program. The compiler program transfers the C instructions into assembly instructions represented as assembly code (often called machine code). The resultant output from the compiler program is called the ".obj file" or object code.

There may be several different object files stored on a disk drive or in a computer's memory and each may represent a different section of the high level program. Therefore, a given C program may reference several object files. Such is well known in the prior art. As the high level program is compiled, object files that are referenced by the program do not have to be compiled again each time. This saves development time.

Several object files may be combined together into a library file or ".lib file." Often used and rarely changed subroutines are compiled into object files and then placed into an object code library file so that they do not have to be compiled each and every time the C program is compiled. This is done in an effort to reduce the compile time of the high level program. If a subroutine is not going to change from one version of the high level program to the next, there is essentially no need to recompile the subroutine for each version of the high level program and therefore the object code library provides the compiled result when needed. In effect, the predefined object code files are "canned" subroutines that have been previously written and compiled and are not expected to change readily.

A linker program is used to link the various object files together and to create a resultant executable file or ".exe file." Therefore, a high level program is compiled then combined with previously compiled files that are referenced by the high level program (if any) and the total is linked to together to create an executable version of the program or "application." The executable file is the file that will be executed by the computer system to perform the instructions that were originally developed in the high level language (i.e., of the C program). The executable file may be referred to as the "executable application."

Also included in the above procedure is a file called the header file or ".h file." The header file contains, among other things, variable definitions and procedure and function definitions that may be incorporated into the high level program by reference. This purpose of the header file is to provide a readily available method of incorporating often used definitions into the high level program without requiring the high level program (i.e., the C program) to recite each definition individually. In other words, a group of variable definitions and or procedure or function definitions (that are expected to used by many applications) may be given a common name, such as "<myfiles.h>." Then, where ever the high level program includes a statement, such as the one listed below:

include <myfiles.h>, the compiler will read the header file for the <myfiles.h> definitions and will incorporate these definitions and/or instructions into the high level program at that point. The result is that the definitions and/or instructions within the <myfiles.h> group will be compiled by the compiler program as if they appeared in the high level program originally at the location where the include statement appears. Use of a header file in the above configuration is also well known in the prior art. In the manner as described above a header file may be viewed as a development tool for the application.

Developments have lead to the introduction of Dynamic Link Library files (DLL files or DLLs) which are files that contain executable program code that corresponds to particular subroutines and program sections. Similar to the notion of providing "canned" object files, Dynamic Link Library files provide "canned" subroutines in executable code format that can be called by other applications to perform certain, known functions.

At run time, these subroutines can be directly called by the executable application in order to perform various tasks. Therefore, the DLL must be resident in memory when the application is executed. In other words, at execution time, the resultant executable code that is produced by the linker program from the high level instructions will call certain subroutines for execution that exist within the DLL file. This requires that the DLL be loaded into the computer system's memory (or available for loading) before the executable program is executed. Therefore, before an executable program (created by the high level language) is executed, the DLL is loaded into the computer's memory.

However, as is often the case, the DLL file that is loaded into memory may or may not be completely compatible with the current executable application that calls subroutines located within the DLL file. This problem arises because the DLL file called by the executable file can be updated and altered after the executable program is developed. Therefore, the DLL resident in memory may not be the DLL expected by the application file even though the subroutine names (of the DLL) are the same. Further, the executable program can be altered and developed after the creation of the DLL file that is called by the executable program.

It is important that the DLL file accept and supply the exact data and control interface expected by the executable file or serious errors will develop in the execution of the executable file. Therefore, it would be advantageous to provide a mechanism to insure that the data interfaces between a DLL file and an executable program are compatible. It is further advantageous to provide a system and method for insuring that the DLL resident in memory is that DLL anticipated by the executable application. The present invention provides such capability.

It is further advantageous to be able to insure that a given subroutine within a DLL file and called by an executable file is the same subroutine that is expected by the executable file. The present invention provides such advantageous functionality. It is further advantageous to be able to negotiate which version or revision level of a given subroutine within a DLL file will be used when called by an executable file in the case where there is not an exact match between the preferred version or revision levels but where there is compatibility between the executable and the DLL file in the sense that there is at least one version or revision level in common that each can operate with correctly. The present invention provides such advantageous functionality.

SUMMARY OF THE INVENTION

A mechanism and method of providing version negotiation between a Dynamic Link Library file (DLL file) and an executable application is described. The present invention provides a version identification which is attributed both to a particular DLL file and to a particular executable program. During execution of the application program, it calls subroutines of the DLL. Initially, the executable program calls the DLL to specify the version number of the DLL preferred by the application program. If the DLL can support this preferred version, then execution continues. If not, then a negotiation process occurs in which the DLL provides the application with a list of the version numbers that the DLL can support. The application looks at each version on the supported list until it finds one with which it can execute. If none of the versions match, then the application program executes an error trap operation and halts normal execution immediately.

The present invention advantageously utilizes version tables both within the application program and within the DLL to verify compatibility of the preferred version as well as to negotiate compatibly if the preferred version is not supported. The application program makes an initial call to the DLL to specify the DLL version with which it prefers to operate. The DLL compares this preferred version number to the version numbers that it supports, which are in a table within the DLL. This table is called the supported DLL version table. In the case where the preferred version matches one of the entries in this table, then the DLL returns an "preferred version OK" flag to the application program. In this case, the application program goes on with its normal execution. However, if the preferred version is not supported (i.e. its version number is not found in the supported version table), then the DLL returns to the application program a "preferred version not supported" flag and a list of versions that it does support. This list of versions returned comes from the table of supported versions within the DLL. In response, the application program compares this list with the versions with which it is compatible—that is, it looks up each version on this list in a table of version numbers contained within the application program. This table is called the compatible version table.

The present invention preferably advantageously utilizes the header file in order to designate a DLL version identification and a version identification within the application program. In addition to the designation of the current version, the header file may contain some or all of the entries for the supported version table within the DLL and for the compatible version table within the application. Any modifications made to the DLL file after the development of the application program will be detected by the present invention, thus preventing run-time errors within the application program caused by such unexpected modifications.

Thus, the present invention insures that there will always be an expected data interface between the DLL and the executable program which relies on the DLL. Further, the present invention prevents a later modified application program from calling an earlier version of the DLL.

Further, the present invention supports negotiation of which version or revision level of a given subroutine within a DLL file will be used when called by an executable file in the case where there is not an exact match between the preferred version or revision levels but where there is compatibility between the executable and the DLL file in the sense that there is at least one version or revision level in common with which each can operate correctly.

DETAILED DESCRIPTION OF THE INVENTION

The present invention includes an apparatus and method for providing a version negotiation capability between a Dynamic Link Library ("DLL") and an associated application program. Within the discussions herein, the "application program" refers to the executable code program that is compiled and linked and is used to execute an application. In the course of its execution, the application program calls subroutines within the DLL. The present invention can operate effectively on a desktop or general purpose computer system. An exemplary computer system is described herein.

In the following detailed description of the present invention numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

DLLs are advantageous in part because they provide, as discussed, routines that are compiled and are in executable form. Before an application program may utilize a DLL, it must be loaded into the computer system's memory or be similarly accessible on disk drive. During run time, an executable program may call subroutines of the DLL to perform a variety of tasks. Input/output interface, disk control, or graphics display, among some of the many tasks available. One of the many benefits of using a DLL file is that often several applications, that may be resident in a computer memory at the same, may use the same procedures for performing routine tasks, such as display interface. Instead of each application program having its own copy of the procedure, only one copy need to be resident in the computer RAM at a time and can be shared by the applications. Therefore, each program may use the DLL subroutine and the amount of RAM required to contain all of the programs at any given time may be significantly reduced.

Also, DLLs are helpful because there may be minor modifications to the subroutines within the DLL file to upgrade them to new system environments without having to recompile and link each of the applications that rely on the DLL file. This is true provided the upgrades are relatively minor and do not interfere with the data interface expected by the application program. For instance, if the display screen was upgraded or certain aspects of the computer were upgraded, the DLL subroutines could be slightly altered to adapt to the new environment. Since the application programs call the DLL subroutines to perform the routine tasks of screen display, these applications would automatically be updated by the DLL update even though the applications themselves were never modified. As such, there is no need to recompile and relink these application programs.

However, if the upgrades to the DLL become severe and interfere with the data interchange expected by the application program, then the updated version of the DLL may cause the application program to fail. The preferred embodiment of the present invention prevents such failures by providing a version negotiating capability between the application program and the DLL file.

Figure 1:
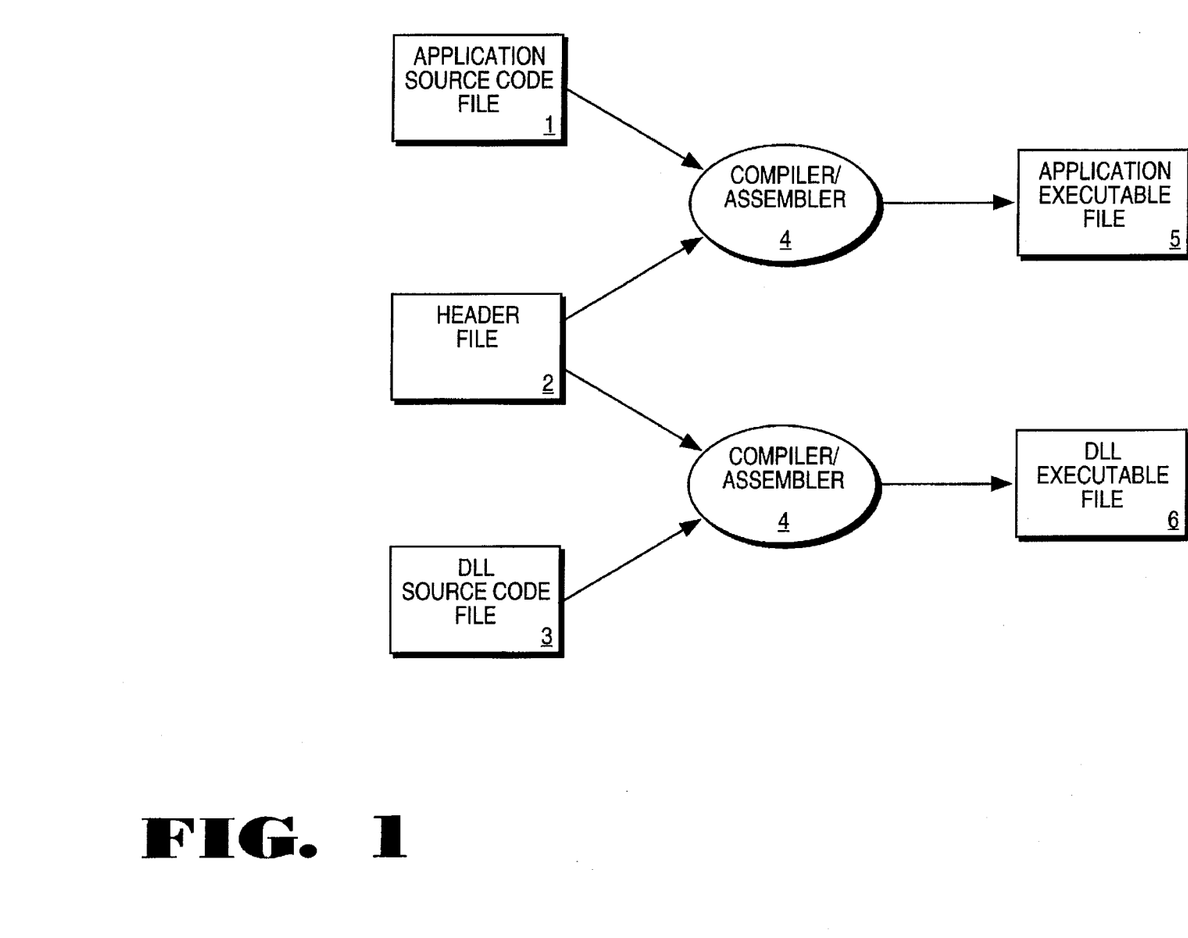
FIG. 1 illustrates the process used to create the application executable file and the DLL executable file from the application source code file, the header file and the DLL source code file.

Referring to FIG. 1, the overall operation of the present invention operates by placing an instruction within header file 2 that defines a particular version number. Preferably, there is a single header file 2 that is invoked by and used in the translation (i.e. the compilation or assembly) of both the application source code file 1 and the DLL source code file 3. Header file 2 is preferably used to create the executable files for both the application and the DLL. For example, within the header file called my_file, there is a statement that will define my_DLL_version as a particular version number. My_file can later be used in the generation of, and my_DLL_version can be incorporated into, both the application executable file and the DLL executable file.

Once translated, the application executable file 5 and the DLL executable file 6 contain the DLL version number preferably as specified in header file 2. The header file supplies much more than simply a version number in general practice. However, the present invention is directed at version negotiating capability. Other information supplied by the header file is not pertinent to the present invention and is not discussed in detail herein.

Figure 2:
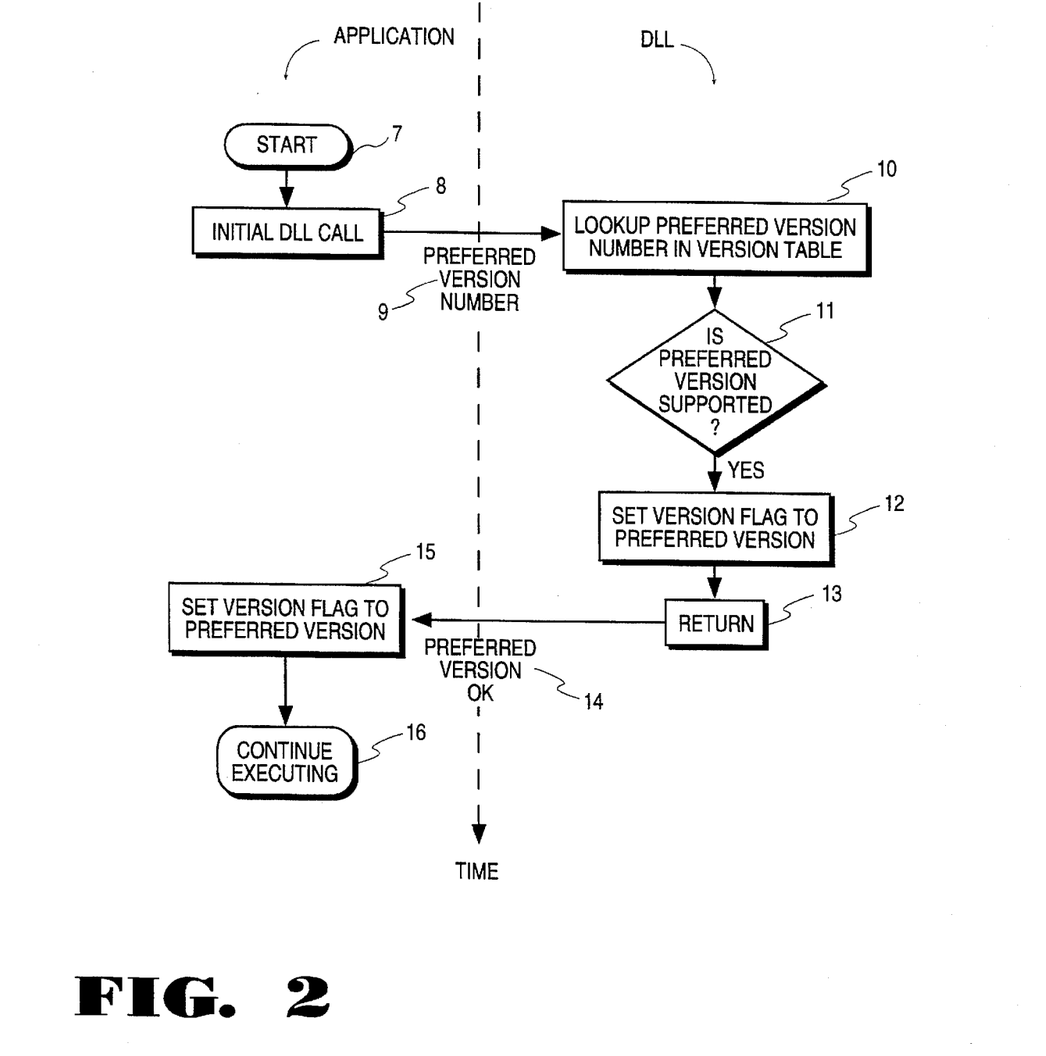
FIG. 2 illustrates the time sequence of the steps used by the present invention in ensuring that the DLL version preferred by the application program is supported by the DLL program.

FIG. 2 is a multi-process flowchart illustrating the interaction between the application program as one process and the DLL program as a second process. FIG. 2 shows the steps each process takes in the case where the preferred version number specified by the application is supported by the DLL.

Sometime after the application starts its execution (step 7), an initial call to the DLL is made (step 8). In initial DLL call 8 the application program passes the value of preferred version number 9 to the DLL. Preferred version number 9 is derived from header file 2 during the translation of application executable file 5. Preferred version number 9 specifies the version of the DLL program that the application prefers to work with, as was specified in header file 2 at the time compiler/assembler 4 translated the application program.

In response to this initial DLL call, the DLL looks up preferred version number 9 in its version table (step 10). Step 11 decides whether or not preferred version 9 is supported, based on whether or not it is found in the DLL's table of versions that it supports.

Figure 3:
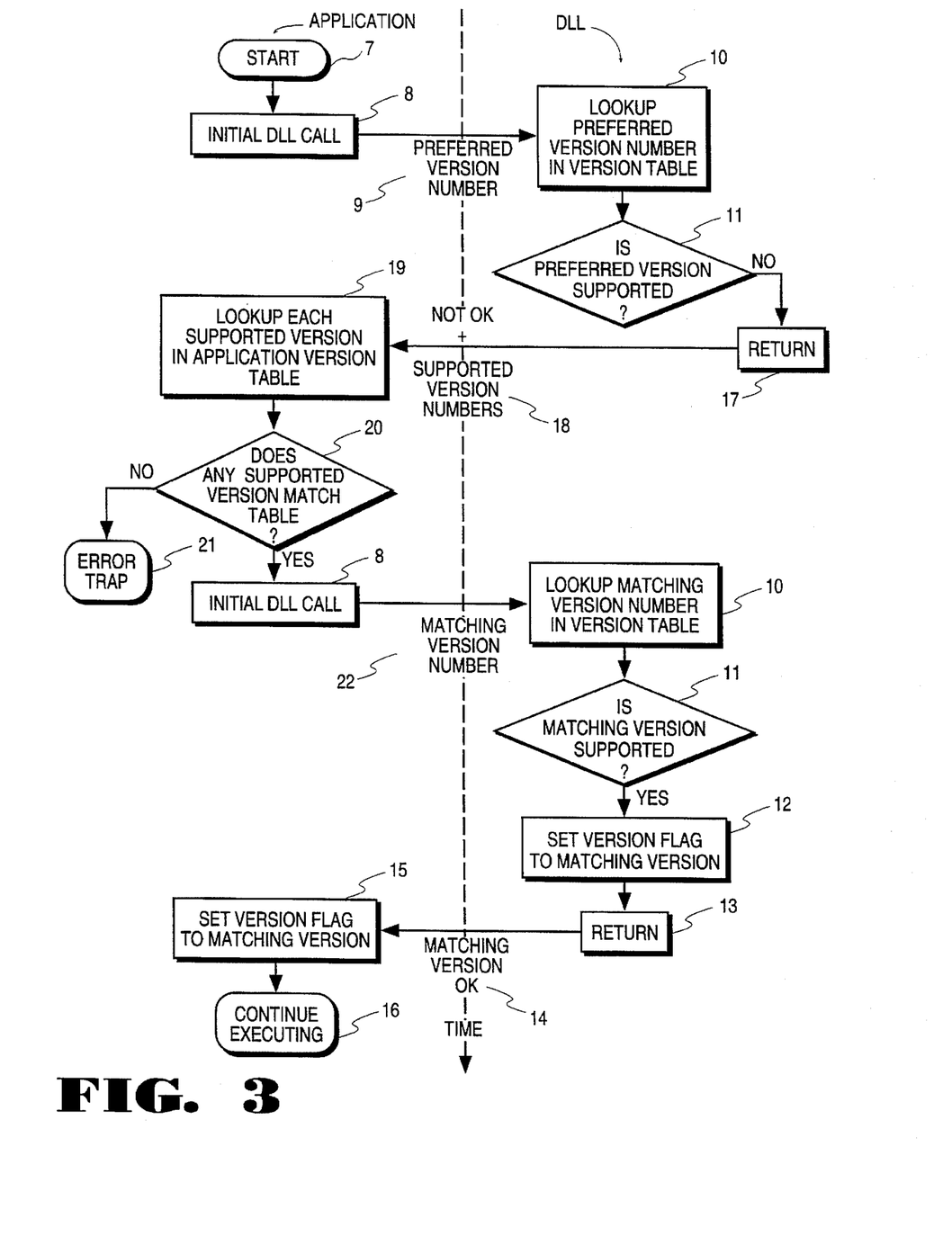
FIG. 3 illustrates the time sequence of the steps used by the present invention in negotiating to see if there is a match between any of the DLL versions supported by the DLL and any of the DLL versions compatible with the application program in the case where the DLL version preferred by the application program is not supported by the DLL program.

FIG. 2 shows the process flow for the case where this preferred version is supported, while FIG. 3 shows the case where the preferred version is not supported. If the preferred version 9 is supported, control passes on to step 12. In step 12, which is optional, the DLL sets the current value of an internal version flag to preferred version number 9. This flag can be used during the execution of the DLL to ensure compatibility with the data passed between the application and the DLL. For example, in the case where a version other than the most recent version is agreed upon in the negotiation process of the current invention, the flag can be used within a more recently updated subroutine to switch control to different, perhaps older code so as to preserve support for the older DLL/application interface.

Next in step 13, the DLL returns "preferred version OK" flag 14 to the application. In response to receiving "preferred version OK" flag 14, the application program in optional step 15 sets the current value of its version flag to preferred version number 9. This flag can be used during the application programs execution to ensure DLL version compatibility. For example, in the case where a version other than the preferred version is agreed upon in the negotiation process of the current invention, the flag can be used to switch program control to a different, perhaps older DLL call so as to preserve compatibility with the older DLL/application interface.

Next, the application continues executing, knowing that DLL version compatibility has been assured by the sequence of steps described in reference to FIG. 2.

FIG. 3 is a multi-process flowchart illustrating the interaction between the application program as one process and the DLL program as a second process. FIG. 3 shows the steps each process takes in the case where the preferred version number specified by the application is not supported by the DLL and version negotiation is required.

Steps 7, 8, 10 and 11 as shown in FIG. 3 are identical to those shown in FIG. 2. That is, soon after the application starts in step 7, it makes an initial call to the DLL in step 8. In this call, the application program passes preferred version number 9 to the DLL as the version of the DLL program that it would prefer to work with. Next, the DLL looks up the preferred version number in its version table (step 10).

However, in step 11, the DLL discovers that the preferred version is not supported. Accordingly, control passed from decision step 11 to step 17. In step 17, the DLL returns to the application a "not OK" or "preferred version not supported" flag indicating that preferred version number 9 is not supported. Additionally, it returns a list of supported version numbers 18.

In response to the "not OK" flag returned by the DLL, the application program continues on to the version negotiation portion of the present invention. The application program looks up each member of the list of supported version numbers 18 in its version table (step 19).

If no supported version matches a version with which it is compatible (as stored in the application program's version table), then decision step 20 passes control on to step 21. Step 21 is an error trap, which typically terminates the execution of the application program after giving a suitable error message. A number of tasks may occur in step 21, including terminating the application program, communicating with an input/output device (such as a display unit) to inform the user of the error, etc.

Alternatively, if there is a supported version that matches an entry in its table of compatible versions, then decision step 20 passes control on to step 8. This execution of step 8 makes an initial call to the DLL specifying matching version number 22 as the version that it would like the DLL to support.

In response to receiving this initial call specifying matching version 22 as the DLL version that the application program prefers, the DLL looks up matching version 22 in its version table (step 10). Next, decision step 11 determines that matching version number 22 is supported—this favorable result is guaranteed because matching version number 22 was originally suggested by the DLL in return step 17. Accordingly, control passes to step 12, in which the DLL sets its internal version flag to matching version number 22. Next in step 13, the DLL returns to the application "matching version OK" flag 14.

In response to "matching version OK" flag 14, the application program in optional step 15 sets its internal version flag to matching version number 22. The application program then continues to execute knowing that it has successfully negotiated version compatibility with the DLL.

In the case where both application executable file 5 and DLL executable file 6 are created using the same version of header file 2, then preferred version number 9 is guaranteed to be found in step 10 in the DLL's table of supported version numbers. This is the expected usual situation. If both the DLL 14 and the application program 12 contain the same version number, then decision step 11 will find that the preferred version is supported and step 13 will return "preferred version OK" flag to the application program. In this case, there should be compatible data interchange between the subroutine calls of the application program and the corresponding subroutines contained within DLL 14.

In the case where a newer (upgraded) version of the DLL is translated into DLL executable file 6 subsequent to the translation of the application program into application executable file 5, then the version definition section of the header file 10 is updated according to the present invention. When the new DLL is compiled and linked, the upgraded version number within the header file 2 is incorporated into the new version of DLL executable file 6. Assuming the application program 12 is not altered, or at least not retranslated, then it will contain the old or previous version number, as defined in the previous version of header file 2 that was used to translate it.

Thus, in this case DLL executable file 6 contains a upgraded version number as defined in the header file, but application executable file 5 does not. Upon execution of the application program, it makes initial DLL call 8 specifying the older DLL version number as preferred version number 9. It is possible, but not certain, that the newly updated version of DLL executable file 6 will find this older version number in its table of versions that it can support and thus will return "preferred version OK" flag 14 to the application program.

Whether or not to place the previous version number in the table of compatible versions is decided by the programmer updating the DLL. This decision is made based on whether the changes in the new update of the DLL are minor and invisible to the application program or whether they are more significant and involve the manner in which information and control is passed back and forth between the DLL and the application program. If the former, then the programmer can safely place the old version number in the DLL's table of supported versions. If the latter, then the programmer can not, unless he makes use of the version flag that is set in step 12 and includes in the new version of the DLL optionally executed code that interfaces with the application program via the old version's interface. This compatibility code would be conditionally executed only if the current value of that version flag indicates that the interface of an older version of the DLL has been agreed upon during the version negotiation process of the present invention.

Figure 4:
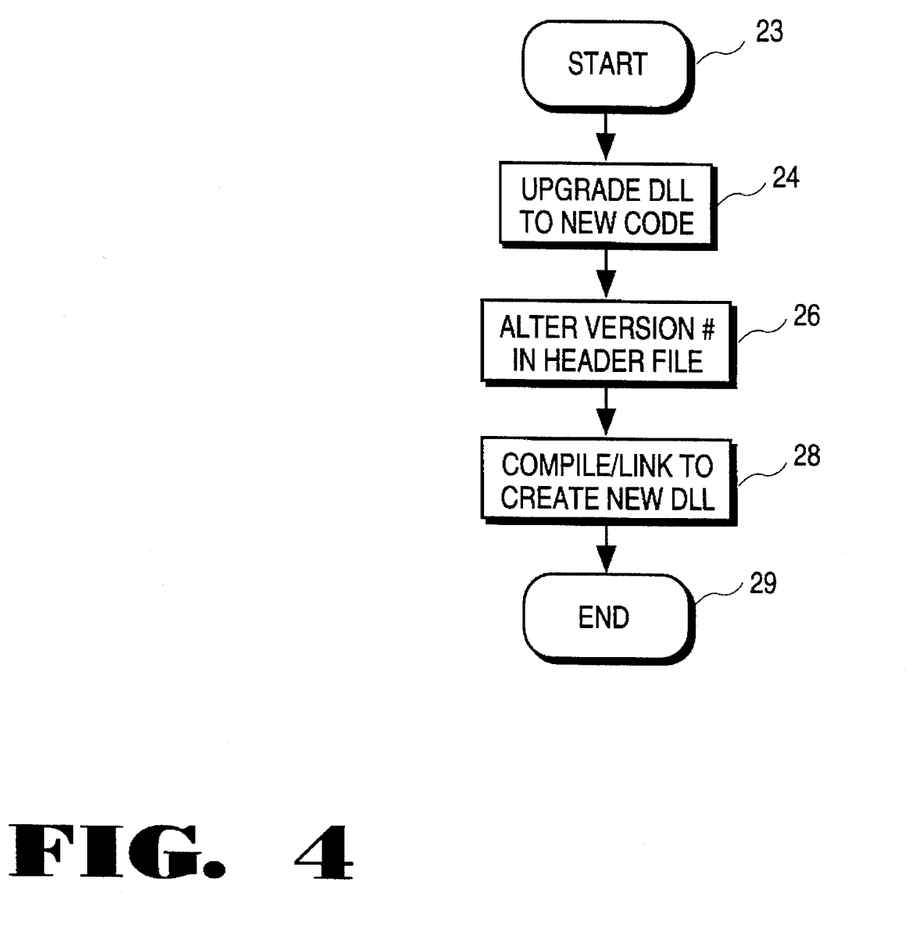
FIG. 4 is a flow chart illustrating the steps used by the present invention to construct a new DLL.

FIG. 4 is a flow chart for generating a new version of the DLL. These steps are utilized by the present invention when the DLL is initially created or when the DLL is updated from one version to another to an extent that may interfere with the previous and expected data interchanges and interfaces between the application and the DLL files. The flow begins at step 23 and continues to step 24 wherein the DLL source files are updated with new or modified program code, thus altering the routines within the DLL 14. Step 24 also includes the case where the DLL is initially generated from scratch. Step 24 may include the addition of new commands to the existing routines, the addition of new routines entirely, the removal of routines from the program code, or other alterations.

After DLL source code file 3 has been updated, header file 2 is altered such that it contains a new version number to correspond to the updated DLL (step 26). Portions of header file 2 are included into the DLL when the DLL program is translated. Below is an illustrative statement that the present invention includes in the header file 10 to define the version number:

<my_file>

Define my_DLL_version 3.21.

The version, 3.21, will be updated in step 26 depending on its previous value and to reflect the changes made to the DLL in step 24.

In step 28, the DLL is translated to generate an executable DLL file 6 that will contain the version, 3.21, that was set in step 26. DLL source code file 3 includes a statement that incorporates the above definition into the DLL 14 during translation. Such a statement is shown below:

Include <myfile>

By using the above statement, DLL will import from header file 2 the current version value, 3.21. This version number will be associated with the variable or label called my_DLL_version.

Figure 5:
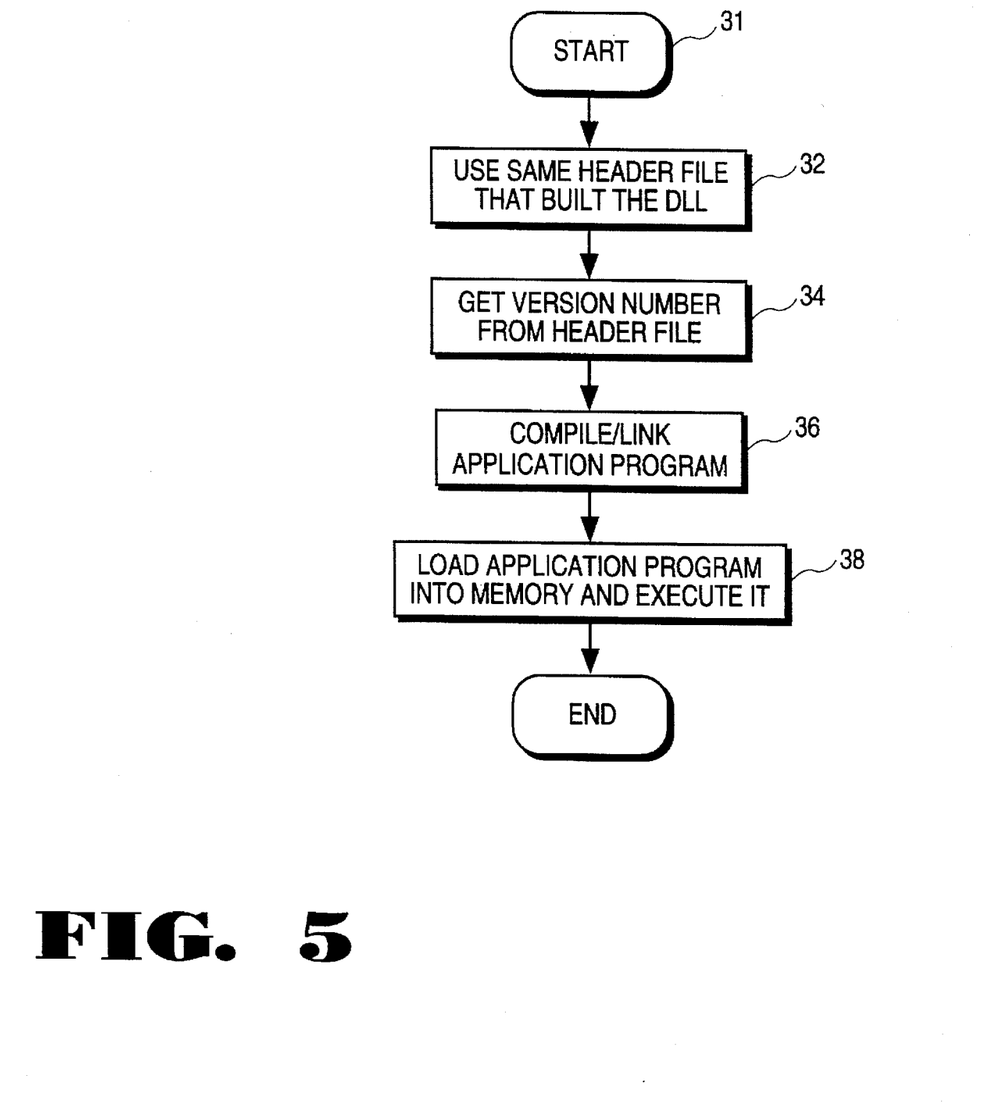
FIG. 5 is a flow chart illustrating the steps used by the present invention to create an application program.

FIG. 5 illustrates the major steps of the present invention that relate to the generation and execution of an application program that utilizes routines of the DLL. The flow begins at step 31 and flows to step 32. The application program, written in a high level or assembly language, uses same header file 2 that was used to generate the DLL. In step 34, the application program will utilize a statement to include the definition section of the header file 2 that includes the current DLL version. This statement is similar to the statement as used by the DLL. Therefore, the application program will directly have access to the version number of the latest DLL that was updated because both the DLL and the application program utilize the same header file 2.

In step 36 of FIG. 5, the present invention compiles or assembles and links the application program. In step 38, the present invention loads the DLL executable file 6 into the memory (such as RAM 102) of the computer system 112 (see FIG. 6) and also loads the application executable file 5 into the computer system memory 102. In step 38, the computer system 112 then executes the application program 12 which includes the DLL version negotiation process discussed above.

Figure 6:
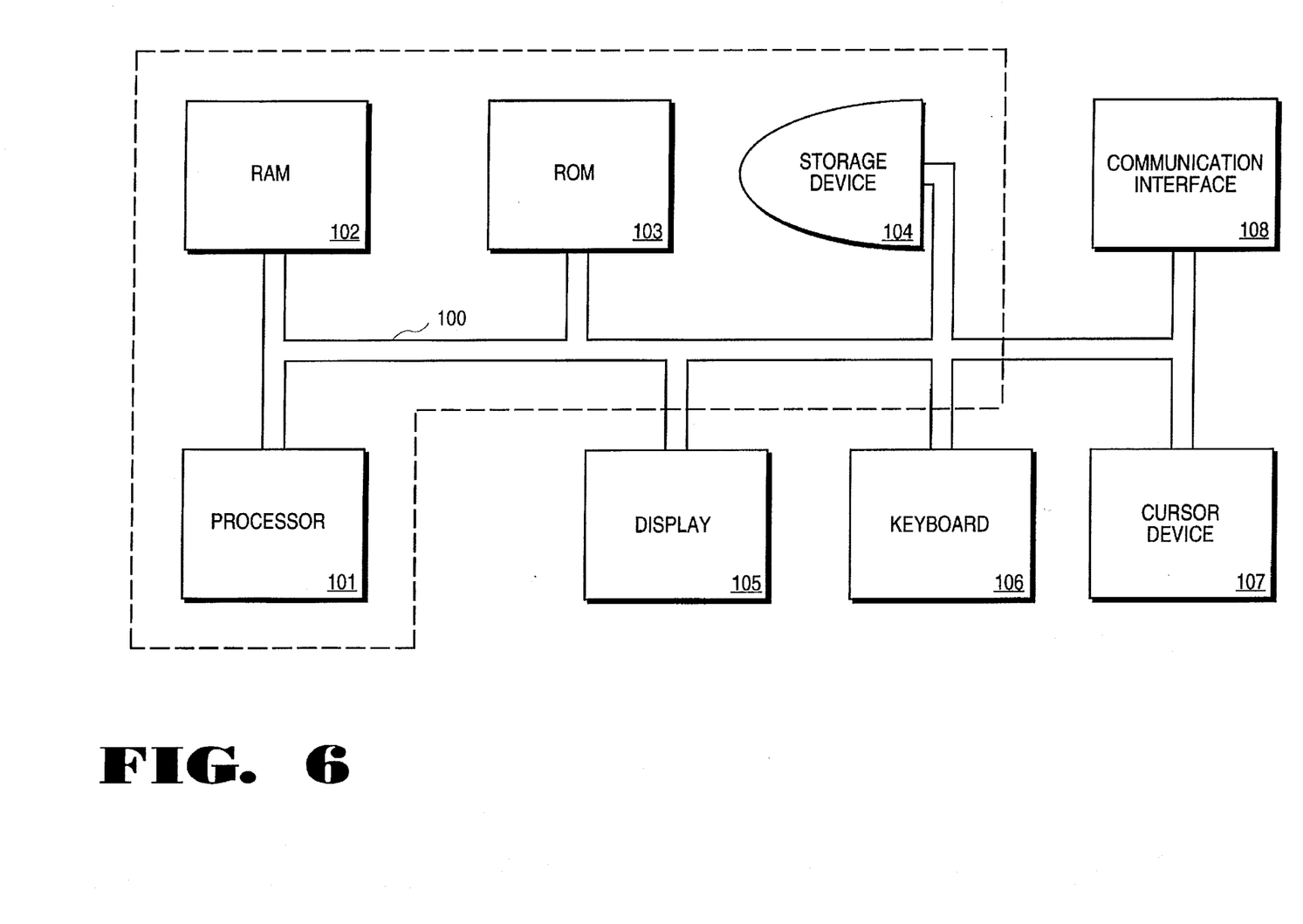
FIG. 6 is a logical block diagram of a general purpose computer system suitable for executing the present invention.

FIG. 6 shows a general computer system 112 within which the embodiments of the present invention can operate. The computer system 112 is capable of executing the application program and the DLL program. Further, the general purpose computer system 112 is capable of operating the compiler program and the linking program as discussed above.

In general, computer systems 112 used by the preferred embodiment of the present invention comprise a bus 100 for communicating information, a central processor 101 coupled with the bus for processing information and instructions, a random access memory 102 coupled with the bus 100 for storing information and instructions for the central processor 101, a read only memory 103 coupled with the bus 100 for storing static information and instructions for the processor 101, a data storage device 104 such as a magnetic disk and disk drive coupled with the bus 100 for storing information and instructions, a display device 105 coupled to the bus 100 for displaying information to the computer user, an alphanumeric input device 106 including alphanumeric and function keys coupled to the bus 100 for communicating information and command selections to the central processor 101, a cursor control device 107 coupled to the bus for communicating user input information and command selections to the central processor 101, and a signal generating device 108 coupled to the bus 100 for communicating command selections to the processor 101.

The display device 105 of FIG. 6 utilized with the computer system 112 of the present invention may be a liquid crystal device, cathode ray tube, or other display device suitable for creating graphic images and alphanumeric characters recognizable to the user. The cursor control device 107 allows the computer user to dynamically signal the two dimensional movement of a visible symbol (pointer) on a display screen of the display device 105. Many implementations of the cursor control device are known in the art including a trackball, mouse, joystick or special keys on the alphanumeric input device 105 capable of signaling movement of a given direction or manner of displacement. It is to be appreciated that the cursor means 107 also may be directed and/or activated via input from the keyboard using special keys and key sequence commands. Alternatively, the cursor may be directed and/or activated via input from a number of specially adapted cursor directing devices.

The preferred embodiment of the present invention, a method and mechanism of providing version negotiation between a Dynamic Link Library and an executable file, is described. While the present invention has been described in particular embodiments, it should be appreciated that the present invention should not be construed as limited by such embodiments, but rather construed according to the below claims.

I claim:

1. A method of executing an application program and a Dynamic Link Library (DLL), comprising:

said application program making an initial call to said DLL to specify a preferred version number;

said DLL looking up said preferred version number in a supported version table, and, if found, returning to said application program a "preferred version OK" indication, and, if not found, returning to said application program both a "preferred version not supported" indication and at least one supported version number from said supported version table, said supported version table including a set of independent version numbers that said DLL supports;

said application program continuing its execution in response to said "preferred version OK" indication; and said application program, in response to said "preferred version not supported" indication, comparing each said supported version number against each of a set of independent version numbers with which said DLL is compatible, said compatible version set being held in a compatible version table, and, if there is no match there between, performing an error trap operation, and, if there is a match there between, making an initial call to said DLL specifying as said preferred version number the version number of said match.

2. A method according to claim 1, further comprising:

said DLL setting the value of a current version indicator internal to said DLL to said preferred version just prior to returning said "preferred version OK" indication, said DLL using said internal version indicator to ensure support of said preferred version.

3. A method according to claim 1, further comprising:

said application program setting the value of a current version indicator internal to said application program to said preferred version just prior to continuing its execution.

4. A method of negotiating dynamic link library (DLL) version compatibility, comprising:

(a) translating a header file and a DLL source code file into a DLL, said header file specifying a current DLL version number, and said DLL having a table that includes a set of independent version numbers which said DLL supports;

(b) translating said header file and an application source file into an application program, said header file specifying an expected DLL version number, and said application program having a table that incudes a set of independent version numbers with which said application program is compatible; and (c) executing said application program and said DLL, said execution comprising:

(i) said application program making an initial call to said DLL to specify as a preferred version number said current DLL version number from said header file;

(ii) said DLL looking up said preferred version number in said supported version table, and, if found, returning to said application program a "preferred version OK" indication and, if not found, returning to said application program both a "preferred version not supported" indication and at least one supported version number from said supported version table;

(iii) said application program continuing its execution in response to said "preferred version OK" indication; and (iv) said application program, in response to said "preferred version not supported" indication, comparing each said supported version number against each compatible version number in said compatible version table, and, if there is no match there between, performing an error trap operation, and, if there is a match there between, making an initial call to said DLL specifying as said preferred version number the version number of said match.

5. A method according to claim 4, wherein said execution step further comprises:

(v) said DLL setting the value of a current version indicator internal to said DLL to said preferred version just prior to returning said "preferred version OK" indication, said DLL using said internal version indicator to ensure support of said preferred version.

6. A method according to claim 4, wherein said execution step further comprises:

(v) said application program setting the value of a current version indicator internal to said application program to said preferred version just prior to continuing its execution.

7. In a computer system comprising a bus, a processor coupled to said bus, a memory coupled to said bus and an input/output device coupled to said bus, a method of executing an application program and a Dynamic Link Library (DLL), said method comprising the computer implemented steps of:

making an initial call originating from said application program to said DLL to specify a preferred version number associated with said application program;

looking up said preferred version number by said DLL in a supported version table stored within said DLL, said supported version table including a set of independent version numbers that said DLL supports;

returning to said application program a "preferred version OK" indication if said preferred version number is located within said supported version table;

returning to said application program both a "preferred version not supported" indication and at least one supported version number from said supported version table if said preferred version is not located within said supported version table;

continuing execution of said application program in response to said "preferred version OK" indication returned thereto; and said application program, in response to said "preferred version not supported" indication, comparing each said supported version number against each of a set of independent version numbers with which it is compatible, said compatible version set being held in a compatible version table stored within said application program, and, if there is no match there between, performing an error trap operation, and, if there is a match there between, making an initial call to said DLL specifying as said preferred version number the version number of said match.

8. A method according to claim 7, further comprising the step of:

said DLL setting the value of a current version indicator internal to said DLL to said preferred version just prior to returning said "preferred version OK" indication, said DLL using said internal version indicator to ensure support of said preferred version.

9. A method according to claim 7, further comprising the step of:

said application program setting the value of a current version indicator internal to said application program to said preferred version just prior to continuing its execution.

10. In a computer system comprising a bus, a processor coupled to said bus, a memory coupled to said bus and an input/output device coupled to said bus, a method of negotiating dynamic link library (DLL) version compatibility, said method comprising the steps of:

(a) translating a header file and a DLL source code file into a DLL, said header file specifying a current DLL version number, and said DLL having a table that includes a set of independent version numbers which said DLL supports;

(b) translating said header file and an application source file into an application program, said header file specifying an expected DLL version number, and said application program having a table that includes a set of independent version numbers with which said DLL is compatible; and (c) executing said application program and said DLL, said execution comprising:

(i) making an initial call originating from said application program to said DLL to specify as a preferred version number said current DLL version number from said header file;

(ii) looking up said preferred version number by said DLL in said supported version table stored with said DLL, and, if found, returning to said application program a "preferred version OK" indication and, if not found, returning to said application program both a "preferred version not supported" indication and at least one supported version number from said supported version table;

(iii) continuing execution of said application program in response to said "preferred version OK" indication returned thereto; and (iv) said application program, in response to said "preferred version not supported" indication, comparing said supported version number against each said compatible version number, and, if there is a match there between, making an initial call to said DLL specifying as a preferred version number the version number of said match.

11. A method according to claim 10, wherein step (iv) performs the further step of:

if there is no match between said returned version supported against said compatible version table stored within said application program, performing an error trap operation.

12. A method according to claim 11, wherein said execution step further comprises the step of:

(v) said DLL setting the value of a current version indicator internal to said DLL to said preferred version just prior to returning said "preferred version OK" indication, said DLL using said internal version indicator to ensure support of said preferred version.

13. A method according to claim 11, wherein said execution step further comprises the step of:

(v) said application program setting the value of a current version indicator internal to said application program to said preferred version just prior to continuing its execution.

14. A computer system comprising:

a bus, a processor coupled to said bus, a memory coupled to said bus and an input/output device coupled to said bus, wherein said processor implements a method of executing an application program and a Dynamic Link Library (DLL);

said processor making an initial call originating from said application program to said DLL to specify a preferred version number associated with said application program;

said processor looking up said preferred version number by said DLL in a supported version table that includes a set of version numbers which said DLL supports;

said processor returning to said application program a "preferred version OK" indication if said preferred version number is located within said supported version table;

said processor returning to said application program both a "preferred version not supported" indication and at least one supported version number from said supported version table if said preferred version is not located within said supported version table;

said processor continuing execution of said application program in response to said "preferred version OK" indication returned thereto; and said application program, in response to said "preferred version not supported" indication, instructing said processor to compare each said supported version number against each of a set of independent version numbers; with which said DLL is compatible, said set being held in a compatible version table stored within said application program, and, if there is no match there between, performing an error trap operation, and, if there is a match there between, said processor making an initial call to said DLL specifying as said preferred version number the version number of said match.

15. A computer system according to claim 14, wherein said DLL instructs said processor to set the value of a current version indicator internal to said DLL to said preferred version just prior to returning said "preferred version OK" indication, said DLL using said internal version indicator to ensure support of said preferred version.

16. A computer system according to claim 14, wherein said application program instructs said processor to set the value of a current version indicator internal to said application program to said preferred version just prior to continuing its execution.

* * * * *